UNITED STATES PATENT OFFICE 2,465,316

VINYL HALO BENZOATES

David T. Mowry and George E. Ham, Dayton, Ohio, assignors to Monsanto Chemical Company, St. Louis, Mo., a corporation of Delaware No Drawing. Application March 27, 1948, Serial No. 17,581

4 Claims. (Cl. 260—476)

This invention relates to new chemical compounds and more particularly to new vinyl esters having unusual chemical and physical properties which are more fully described hereinafter.

Polymeric vinyl acetate is a well known thermoplastic composition. It is also known that the low heat distortion point and tensile properties of the polymeric vinyl acetate can be improved by copolymerization with vinyl benzoate. When prepared by bulk polymerization methods these copolymers are not thermoplastic, and therefore are not useful in most of the applications in which polyvinyl acetate is customarily used. In copending application, Serial No. 5,481, filed January 30, 1948, by George E. Ham, there is described and claimed a method of preparing thermoplastic copolymers of vinyl acetate and vinyl benzoate by copolymerization in solution. The solution polymerization method is not generally adapted to large scale production, but the emulsion polymerization method is ineffective in preparing the copolymers.

The purpose of this invention is to provide new vinyl esters which, unlike vinyl benzoate, may be copolymerized with vinyl acetate by industrially practicable emulsion methods, to form useful thermoplastic resins. A further purpose of the invention is to provide new substituted vinyl benzoates which are useful in preparing high molecular weight products with superior mechanical properties. A still further purpose of the invention is to provide new and useful chemical compounds.

It has been found that the halogen substituted vinyl benzoates in which the substituent is on the benzene ring in any of the ortho-, meta-, or para-positions are readily copolymerizable with vinyl acetate, whereas vinyl benzoate copolymerizes only with difficulty and then usually forms undesirable products. The new compounds may be represented by the structural formula:

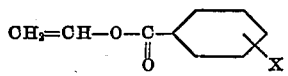

wherein X is a halogen radical, such as chlorine, fluorine or bromine.

The new vinyl esters of the halogen substituted benzoic acid may be prepared from the corresponding substituted benzoic acids by ester interchange with vinyl acetate in the presence of suitable catalysts, such as the mercury salts and particularly mercurous acetate. The reaction is preferably conducted in an acid medium, for example in the presence of a small proportion of sulfuric acid. It is also desirable to conduct the reaction in the presence of a small amount of a suitable polymerization inhibitor, such as hydroquinone, pyrogallol, t-butyl catechol, copper salts, or any other substance known to inhibit olefinic polymerizations. Reaction mixtures containing the necessary and desirable ingredients are heated at reflux temperature for sufficient periods of time to effect the ester interchange. The vinyl esters so produced may be separated from the reaction mass by vacuum distillation methods; others, being solids, can be purified by recrystallization.

The new compounds may also be prepared from acetylene by reaction with the halogen substituted benzoic acids in the presence of suitable catalysts, for example zinc and cadmium salts.

Further details of the invention are set forth with respect to the following specific examples.

Example 1

A 1-liter flask was charged with 236 grams of p-chlorobenzoic acid, 258 grams of vinyl acetate, 5 grams of mercuric acetate, 0.5 cc. of concentrated sulfuric acid, and 7 grams of hydroquinone. The mixture was refluxed on a water bath for thirty-six hours during which time the p-chlorobenzoic acid was entirely dissolved. The resultant solution was then distilled, removing the excess vinyl acetate and the ethylidene diacetate under reduced pressure. The product boiling at 122 to 123° C. at 20 m. pressure was cooled. Upon cooling the mass solidified and was recrystallized from dilute ethanol. The purified product so obtained had a melting point of 48 to 49° C. and was identified as vinyl p-chlorobenzoate.

Example 2

Using the procedure substantially the same as that described in the preceding paragraph, vinyl acetate was reacted with o-chlorobenzoic acid to obtain vinyl o-chlorobenzoate which was a liquid having a boiling point of 115 to 117° C. at 12 mm. pressure.

The new vinyl halobenzoates are very stable compounds capable of polymerization in the presence of catalysts to form valuable synthetic resins. They may be polymerized either by themselves or conjointly with a wide variety of olefinic monomers.

In copending application Serial No. 17,583, filed Mar. 27, 1948, by George E. Ham and David T. Mowry, there are described and claimed copolymers of vinyl acetate and the new vinyl halobenzoates herein claimed.

Although the invention has been described with respect to specific embodiments thereof, it is not intended that the details shall be construed as limitations upon the scope of the invention except to the extent incorporated in the following claims.

We claim:

1. Vinyl aromatic esters having the structural formula:

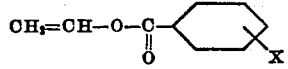

wherein X is a halogen radical.

2. Vinyl p-chlorobenzoate.
3. Vinyl o-chlorobenzoate.
4. Vinyl m-chlorobenzoate.

DAVID T. MOWRY.
GEORGE E. HAM.

No references cited.